(12) United States Patent
Cooper et al.

(10) Patent No.: US 7,659,808 B1
(45) Date of Patent: Feb. 9, 2010

(54) AUTOMOTIVE MESSAGING DISPLAY UNIT

(76) Inventors: Richard P Cooper, 620 Peachtree St., No. 912, Atlanta, GA (US) 30308; Adam Cooper, 620 Peachtree St., No. 912, Atlanta, GA (US) 30308; Phil Bayer, 620 Peachtree St., No. 912, Atlanta, GA (US) 30308

( * ) Notice: Subject to any disclaimer, the term of this patent is extended or adjusted under 35 U.S.C. 154(b) by 222 days.

(21) Appl. No.: 11/507,309

(22) Filed: Aug. 21, 2006

(51) Int. Cl.
*B60Q 1/00* (2006.01)
(52) U.S. Cl. .................... 340/425.5; 340/470; 340/471; 340/691.6
(58) Field of Classification Search ............. 340/425.5, 340/468, 470–473, 691.6
See application file for complete search history.

(56) References Cited

U.S. PATENT DOCUMENTS

| | | | |
|---|---|---|---|
| 5,124,845 A | 6/1992 | Shimojo | |
| 5,825,281 A | 10/1998 | McCreary | |
| 5,905,434 A * | 5/1999 | Steffan et al. | 340/468 |
| 6,300,870 B1 * | 10/2001 | Nelson | 340/468 |
| 6,304,174 B1 * | 10/2001 | Smith et al. | 340/471 |
| 7,477,140 B1 * | 1/2009 | Booth et al. | 340/471 |
| 2003/0227375 A1 * | 12/2003 | Yong | 340/425.5 |
| 2004/0036622 A1 | 2/2004 | Dukach et al. | |
| 2004/0097195 A1 * | 5/2004 | Selleck | 340/425.5 |
| 2004/0145463 A1 | 7/2004 | Weatherspoon | |
| 2004/0239493 A1 * | 12/2004 | Miller | 340/471 |
| 2005/0083183 A1 | 4/2005 | Cao et al. | |

FOREIGN PATENT DOCUMENTS

| | | |
|---|---|---|
| EP | 1.349.136 | 10/2003 |
| FR | 2.854.482 | 11/2004 |
| GB | 2.227.590 | 8/1990 |
| GB | 2.312.072 | 10/1997 |
| GB | 2.337.842 | 12/1999 |
| GB | 2.347.004 | 8/2000 |
| GB | 2.407.198 | 4/2005 |
| WO | WO03/050793 | 6/2003 |
| WO | WO2005119635 | 12/2005 |

* cited by examiner

*Primary Examiner*—Thomas J Mullen
(74) *Attorney, Agent, or Firm*—Michael I Kroll

(57) ABSTRACT

The present invention relates to a communication systems, and more specifically to a vehicular messaging display unit. The unit allows one of a plurality of messages to be displayed on at least one of the front or rear windshield to other drivers. A remote control unit is provided for customizing messages by the user in terms of content and appearance as well as for controlling the display of the messages. The display is designed so that it does not impede the safety of drivers.

6 Claims, 10 Drawing Sheets

AUTOMOTIVE MESSAGING DISPLAY UNIT

BACKGROUND OF THE INVENTION

1. Field of the Invention

The present invention relates to a communication systems, and more specifically to a vehicular messaging display unit. The unit allows one of a plurality of messages to be displayed on at least one of the front or rear windshield to other drivers. A remote control unit is provided for customizing messages by the user in terms of content and appearance as well as for controlling the display of the messages. The display is designed so that it does not impede the safety of drivers.

2. Description of the Prior Art

Numerous other vehicular message display systems exist in the prior art. However, no vehicular message display system exists as described in the present invention. While prior art vehicular message display systems may be suitable for the particular purpose to which they address, they would not be as suitable for the purposes of the present invention as heretofore described.

SUMMARY OF THE PRESENT INVENTION

The present invention relates to a communication systems, and more specifically to a vehicular messaging display unit. The unit allows one of a plurality of messages to be displayed on at least one of the front or rear windshield to other drivers. A remote control unit is provided for customizing messages by the user in terms of content and appearance as well as for controlling the display of the messages. The display is designed so that it does not impede the safety of drivers.

A primary object of the present invention is to provide a vehicular message display system that overcomes the shortcomings of the prior art.

Another, secondary object of the present invention is to provide a vehicular message display system that allows communication between drivers on the road.

Still another object of the present invention is to provide a vehicular message display system that allows for communication between drivers without increasing the danger to themselves and to other drivers.

Another object of the present invention is to provide a vehicular message display system including a message display unit and remote control unit connected to the display unit for at least one of selecting and displaying a message thereon.

Still yet another object of the present invention is to provide a vehicular message display system wherein the message display unit is located in the interior of the vehicle by the rear or front windshield.

Yet another object of the present invention is to provide a vehicular message display system that displays a mirror image of the selected message on the message display unit when the unit is in the front windshield thereby allowing a person a vehicle ahead to be able to read the displayed message in a rearview mirror.

A further object of the present invention is to provide a vehicular message display system whereby the system includes a plurality of pre-set messages.

Still yet another object of the present invention is to provide a vehicular message display system wherein a user may customize messages for display or use the pre-set messages.

Still another object of the present invention is to provide a vehicular message display system wherein the user is able to customize the appearance of the text in the message display unit.

Yet another object of the present invention is to provide a vehicular message display system that includes software executable on a personal computer enabling the user to customize the message and the appearance of the message.

Yet another object of the present invention is to provide a vehicular message display system including a connection wire for connecting the remote control unit with a personal computer allowing the customization of the message data to be applied and used by the system.

An even further object of the present invention is to provide a vehicular message display system enabling the user to manually select whether the message is shown.

Yet another object of the present invention is to provide a vehicular message display system whereby the message is displayed for a predetermined amount of time.

Another object of the present invention is to provide a vehicular message display system whereby the use of the brakes overrides the message displayed by the message display unit.

A further object of the present invention is to provide a vehicular message display system whereby the message display unit is powered by the vehicle's battery.

Another object of the present invention is to provide a vehicular message display system whereby the message automatically shuts off when the car is turned off.

Still another object of the present invention is to provide a vehicular message display system whereby the messages are stored by the message display unit.

Yet another object of the present invention is to provide a vehicular message display system that is simple and easy to use.

Still another object of the present invention is to provide a vehicular message display system that is inexpensive to manufacture and operate.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
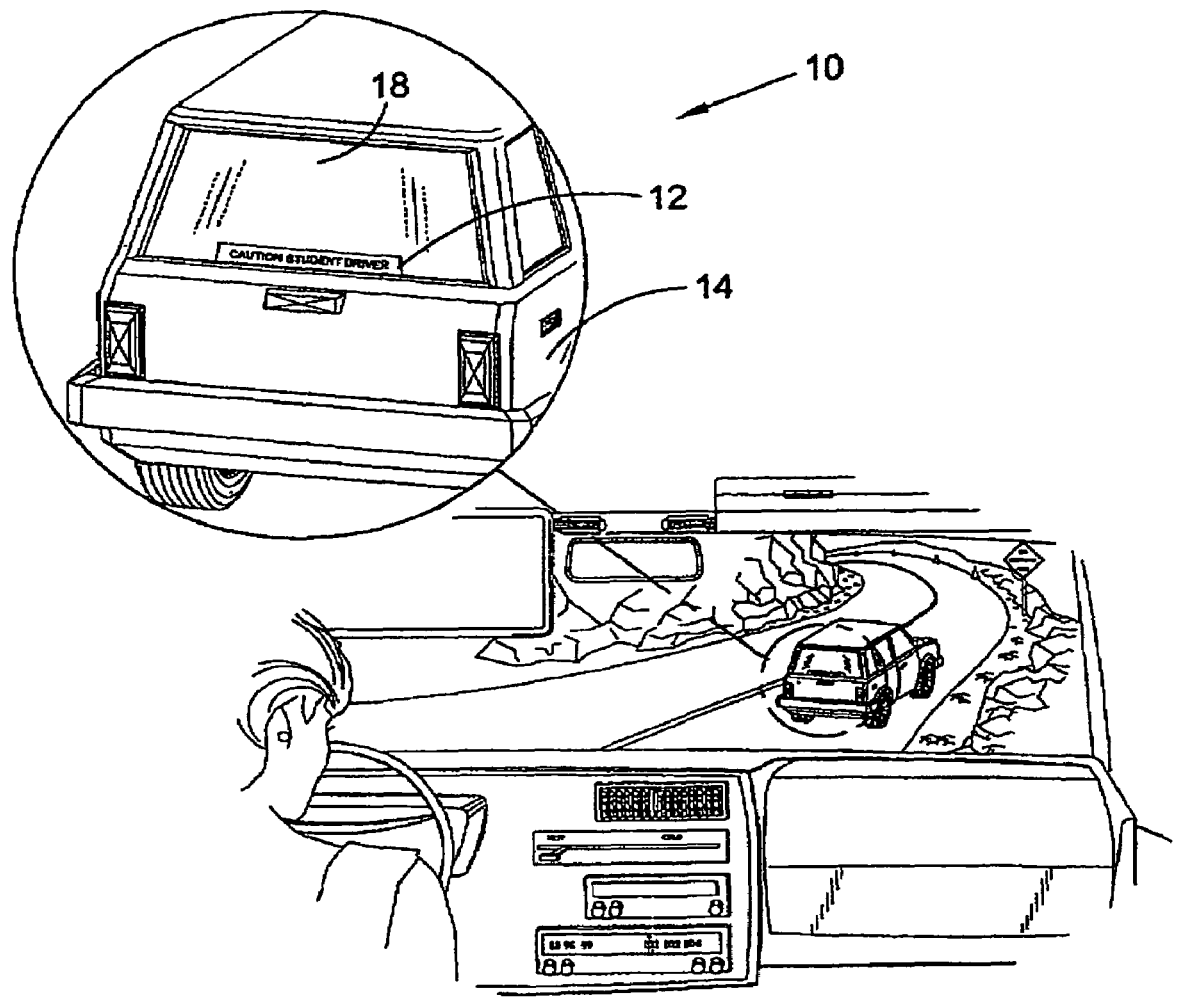
FIG. 1 is an illustrative view of the rear of a car using the vehicular message display system of the present invention.

Turning now descriptively to the drawings, in which similar reference characters denote similar elements throughout the several views, the Figures illustrate the vehicular message display system of the present invention. With regard to the reference numerals used, the following numbering is used throughout the various drawing Figures.

| | |
|---|---|
| 10 | vehicular message display system of the present invention |
| 12 | message display unit |
| 14 | user vehicle |
| 16 | front windshield user vehicle |
| 18 | back windshield user vehicle |
| 20 | other vehicle |
| 22 | front windshield other vehicle |
| 24 | back windshield other vehicle |
| 26 | user |
| 28 | other user |
| 30 | line of vision |
| 32 | user vehicle rearview mirror |
| 34 | control panel |
| 36 | message text box |
| 38 | text box directional arrow |
| 40 | group box |
| 42 | group box directional arrow |
| 44 | front display button |
| 46 | rear display button |
| 48 | scroll speed menu button |
| 50 | scroll direction menu button |
| 52 | moving method menu button |
| 54 | blinking text button |
| 56 | blinking speed menu button |
| 58 | repeat time interval button |
| 60 | text size and style menu button |
| 62 | text color menu button |
| 64 | special symbols and graphics menu button |
| 66 | save button |
| 68 | remote control |
| 70 | power button |
| 72 | 1-10 button |
| 74 | 11-20 button |
| 76 | remote message display |
| 78 | message selection button |
| 80 | auto-off button |
| 82 | manual button |
| 84 | power supply |
| 86 | voltage converter |
| 88 | LED display PCB |
| 90 | communication interface terminal |

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 10 illustrate the vehicular message display system of the present invention which is indicated generally by the numeral 10.

FIG. 1 is an illustrative view of the rear of a user vehicle 14 using the vehicular message display system 10 of the present invention. Herein and throughout the figures, the user vehicle 14 is a car. However, this is for illustrative purposes only, and the system 10 may be used in any vehicle. The vehicular message display system 10 includes a message display unit 12 (MDU). Herein the MDU 12 is located in a back windshield 18 of the user vehicle 14. However, this is for purposes of example only, and the MDU 12 can be located in other locations on the rear of a vehicle such that the MDU 12 is visible to other drivers. The MDU 12 is positioned either within or on the user vehicle 14 in a location that does not make driving unsafe for a user 26 and a driver of a second vehicle 20. The MDU 12 may display one of a plurality of messages that are either pre-set or user-customized, as will be described hereinafter with respect to FIGS. 5-7. These messages alert other drivers to certain situations and/or intentions regarding the user's vehicle 14, such as that the user vehicle 14 is being driven by a student driver, as shown herein, or whether the passengers are going to a game, for example. As an additional safety feature, when the user 26 steps on the brake, the message is removed from the MDU 12. The system 10 is a mechanism for improving safety on roadways. The system accomplishes this goal by providing a visual alert that clearly specifies and defines an action that is being taken by a driver or an action about to be taken by a driver. The visual alert is conspicuously provided to other drivers on the road via the MDU 12. Therefore, the increase in communication between drivers on the road that otherwise have no manner of communicating with one another provides for a more intelligent motor vehicle driving system. The greater amount of information available to users on the road will significantly reduce the amount of unexpected incidents that would, up until now, increase the risk of a motor vehicle accident.

Figure 2:
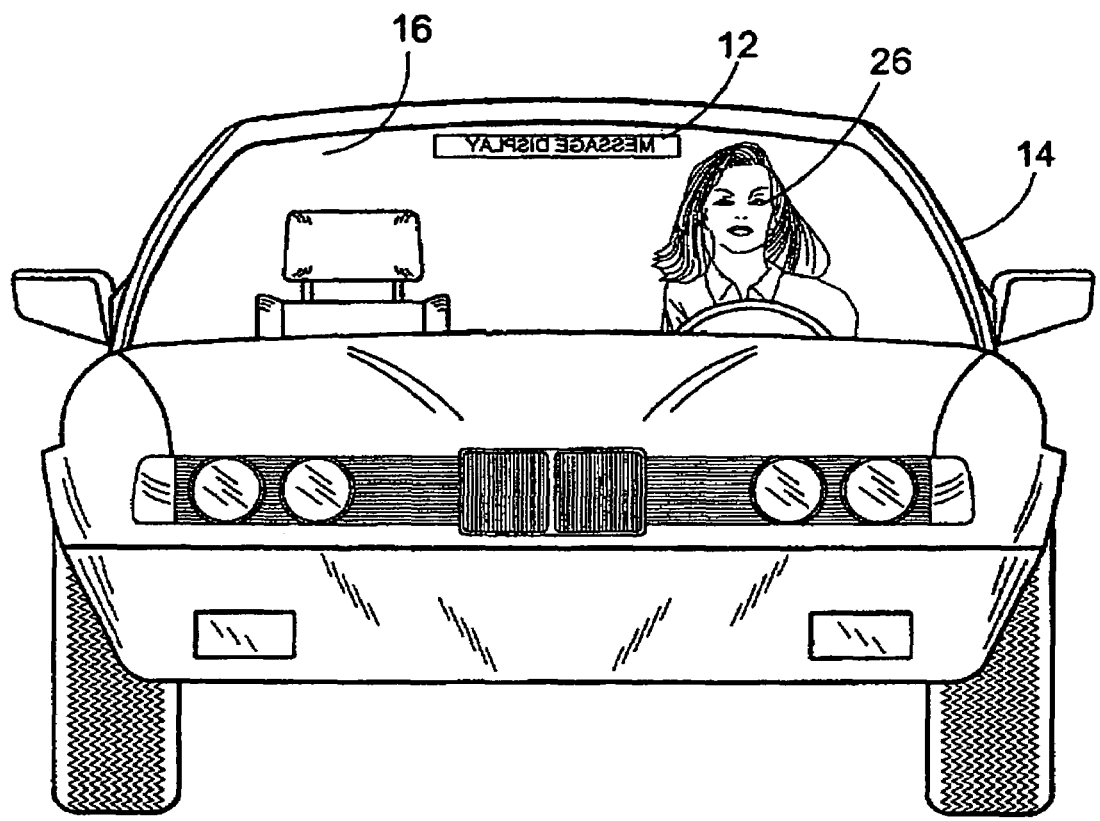
FIG. 2 is an illustrative view of the front of a car using the vehicular message display system of the present invention.

FIG. 2 is an illustrative view of the front of the user vehicle 14 using the vehicular message display system 10 of the present invention. Herein the MDU 12 is located in a front windshield 16 of the user vehicle 14. The MDU 12 is situated so that the user's 26 vision of the road is not impaired. A vehicle having an MDU is able to broadcast the desired message in mirror-image form such that a user 26 in the vehicle positioned ahead thereof is able to read the message as intended. The message displayed on the MDU 12 when the MDU 12 is in the front windshield 16 is a mirror image of the desired message. This enables the driver of the second vehicle 20 to view the message in their respective rear-view mirror. Alternatively, the MDU 12 may be selectively positioned in a plurality of locations within the car such as within the dashboard, atop the dashboard and on the underside of a sun visor. These locations are described for purposes of example only and the MDU 12 may be in any position within the vehicle that allows an image representative of a message that is broadcast from a first vehicle in mirror image form to be properly read by a driver of a second vehicle that is positioned in front of the first vehicle.

Figure 3:
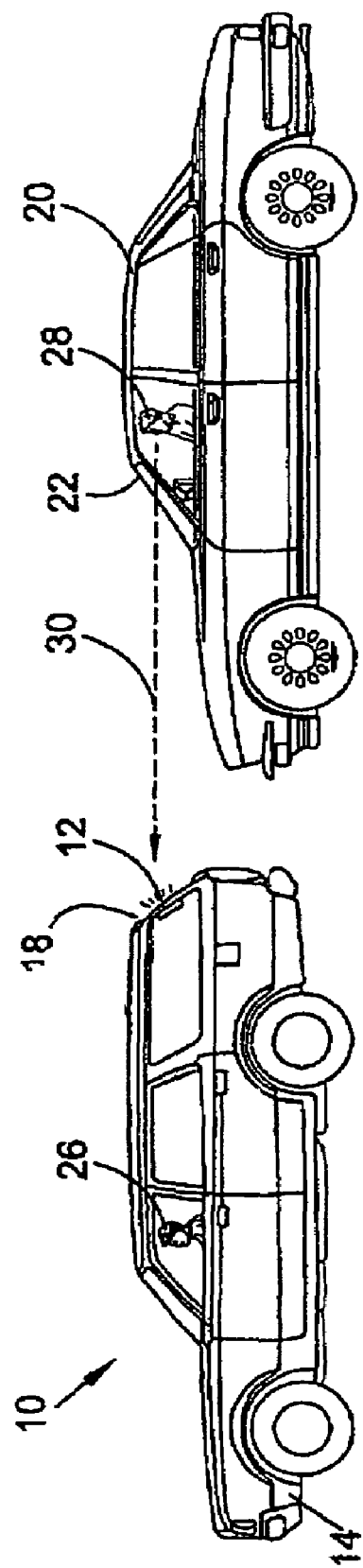
FIG. 3 is an illustrative view of a vehicular message display system of the present invention.

FIG. 3 is an illustrative side view of the vehicular message display system 10 of the present invention in use. Shown herein is a user vehicle 14 having the MDU 12 positioned in front of a second vehicle 20 such that a driver 28 of the second vehicle 20 is able to view the rear end of the user vehicle 14.

The user 26 is driving the user vehicle 14 having the MDU 12 positioned in the back windshield 18 of the user vehicle 14. The MDU 12 is visible by the driver 28 of the second vehicle 20. Additionally, the MDU 12 is visible to any other driver of any other vehicle (not shown) that has a view of the rear end of the user vehicle 14. The second driver 28 is able to look through a front windshield 22 of the second vehicle 20 to view the MDU 12 positioned either in or on the user vehicle 14. The second driver 28 is able to view the message displayed on the MDU 12 and is provided with information regarding the intention and/or action of the user 26. Upon viewing the message, the second driver 28 may act accordingly to operate the second vehicle 20 in a safe manner.

Figure 4:
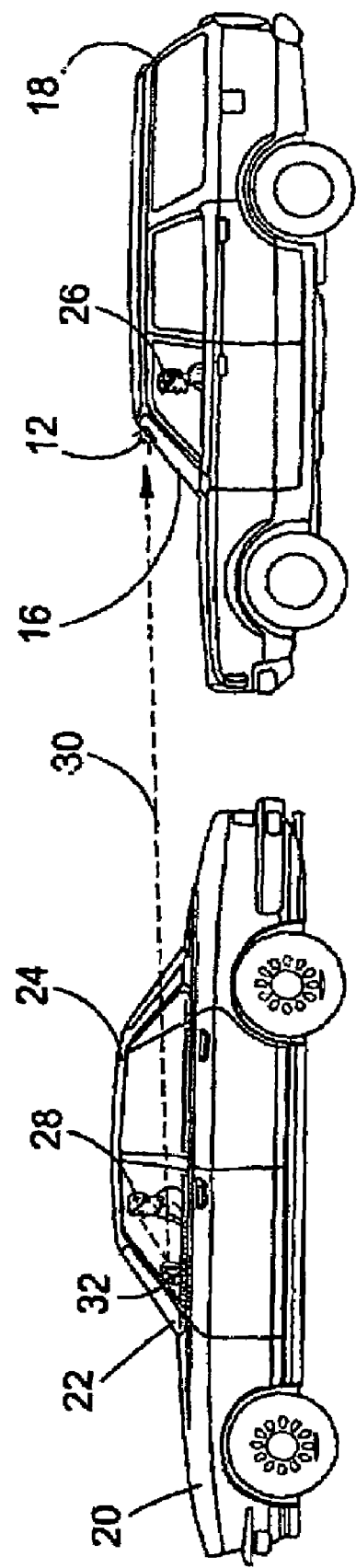
FIG. 4 is an illustrative view of the vehicular message display system of the present invention.

FIG. 4 is an illustrative view of the vehicular message display system 10 of the present invention. The user vehicle 14 is positioned behind the second vehicle 20 for broadcasting a desired message to the driver 28 of the second vehicle. FIG. 4 shows an alternate and/or supplementary position of the MDU 12 in the user vehicle 14. The MDU 12 is positioned either on or proximate to the front windshield 16 of the user vehicle 14. An exemplary position for the MDU 12 is on a rear side of a rearview mirror. Alternatively, the MDU 12 may be formed integral with the rearview mirror of the user vehicle 14. This position allows the desired message to be broadcast for receipt by and display in the second driver's 28 line of vision 30. The desired message is received for display on a mirror positioned in or on the second vehicle 20. As shown herein, the desired message is received on a surface of the side mirror 32. The mirror 32 transposes the broadcast message and the driver 28 of the second vehicle 20 is able to view the desired message as intended. Thus, the driver 28 of the second vehicle is property informed of the intention of the user 26 and/or action taken or to be taken by the user vehicle.

Figure 5:
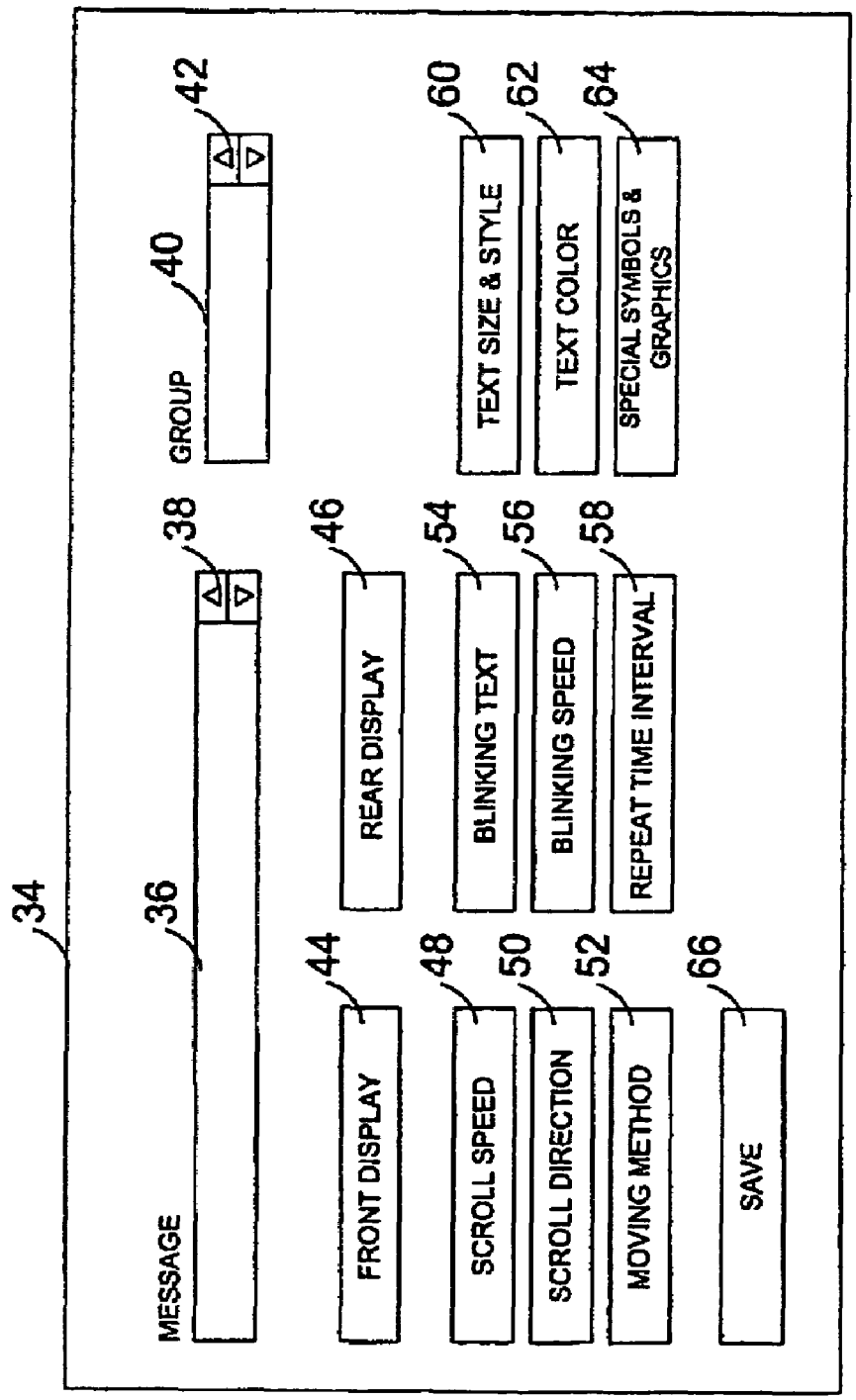
FIG. 5 is an illustrative view of a computer software screen display of the vehicular message display system of the present invention.

FIG. 5 is an illustrative view of a computer software screen display 34 of the vehicular message display system 10 of the present invention. The message display system 10 is selectively controllable by the user 26. The control mechanism may be implemented in at least one hardware device having control instructions stored in a ROM, as a computer software application or a combination thereof. The control mechanism may be formed integral with the user vehicle 26 and connected to the MDU 12 by a plurality of known electrical connections such as conventional wiring, wireless transmission signals and connection via a communication network. The control mechanism may include a screen 34 for allowing interaction with the user 26 for setup and control of system 10 operation. Additionally, the control mechanism may be formed integral with the user vehicle as a stand alone unit or be formed as executable instructions included as part of a vehicle option. The vehicle option may include a touch-screen display unit as is commonly known in the art.

The screen display 34 allows the user 26 to customize the message displayed on the MDU 12, both in terms of text of the message and the appearance. The control mechanism provides user selectable options for display on the display screen 34, which upon selection thereof, allow a user to control and operate the system 10 of the present invention. The desired message is displayed in a message text box 36. The user 26 may enter a new message in the message text box 36 to customize the desired message via an input keypad (not shown) or may select one of a pair of text box directional arrows 38 to scroll through the list of messages already saved in a storage device connected to the system 10.

Additionally, a plurality of messages that are either input or selected by a user may be grouped together using a grouping function. The grouping function provides for successive display of a plurality of messages. A group text box 40 displays the group name associated with the message displayed in the message text box 36. If the message displayed in the message text box 36 is not associated with a group, the group text box 40 is blank. The user 26 may use one of a pair of group box directional arrows 42 to scroll through the groups. The group text box 40 further provides an option for adding a new group title by selecting the "add group" option from the group text box 40. Alternatively, the display screen 34 selectively initiates display of a further screen that displays at least one of the plurality of stored messages and/or the plurality of stored groups that are selectable by the user 26.

The message displayed in the message text box 36 is able to be further customized by selection of other customization buttons 44-64. Generally, the system defaults as having the MDU 12 broadcast or display the message in both the front and rear ends of the user vehicle thereby providing comprehensive information to all drivers on all sides thereof. The user 26 may select a front display 44 button causing the message to be displayed only when the MDU 12 positioned adjacent the front windshield 16 of the user vehicle 14. Alternatively, if the user 26 has an MDU 12 located in each of the front 16 and back 18 windshields, selection of the front display 44 button will have the message displayed only on the MDU 12 located in the front windshield 18 of the user vehicle. The user 26 may select a rear display 46 button to have the message displayed only when the MDU 12 is positioned on a rear end or windshield 18 of the user vehicle 14. Alternatively, if the user 26 has an MDU 12 located in each of the front 16 and back 18 windshields, selection of the rear display 46 button will have the message displayed only on the MDU 12 located in the back windshield 16 of the user vehicle.

The scroll function is operable by selection of the scroll speed button 48. The scroll speed function allows the user 26 to determine the speed with which a plurality of successive messages are displayed. The selection can occur either through the use of a drop down menu or by displaying a separate linked display screen that allows the user 26 to select the speed. This manner of selection of the further customization options may be used for further customization buttons 50-64 which are operable to further customize the broadcast and display of the desired message. Selection of a scroll direction 50 button initiates operation of the directional scrolling option which allows the user 26 to determine the direction that the message is displayed. The directions include but are not limited to, top to bottom, bottom to top, right to left, left to right. Selection of a moving method button 52 allows the user 26 to determine how the message moves, such as in wave-like pattern for example. Selection of a blinking text button 54 initiates operation of the blinking text function which allows the user 26 to have the message blink as it is displayed. Selection of a blinking speed button 56 initiates operation of the blinking speed function and allows the user 26 to decide how fast or slow the displayed message should blink, such as 20 times per minute. Selection of a repeat time interval button 58 initiates the message repetition function and allows the user 26 to determine the frequency with which the sequence of messages is displayed. Selection of a text size and style button 60 and a text color button 62 initiates the text customization feature and allows the user 26 to choose a text size and text style for the displayed message from a plurality of sizes and styles. Selection of a special symbols and graphics button 64 allows the user 26 to accent the displayed message with a plurality of special symbols and graphics. Upon the user selection and initiation of any number of customization features, the user is able to actuate a save button 66 and save data representing the desired message, message group, and associated customization data in a memory.

These selections and customizations may be uploaded to a remote control 68, described hereinafter with respect to FIG. 6, via a USB port or other data-transfer terminal for display in the user vehicle 14. In an alternate embodiment, the MDU 12 includes software enabling the user 26 to make these selections and customizations directly with the MDU 12.

Figure 6:
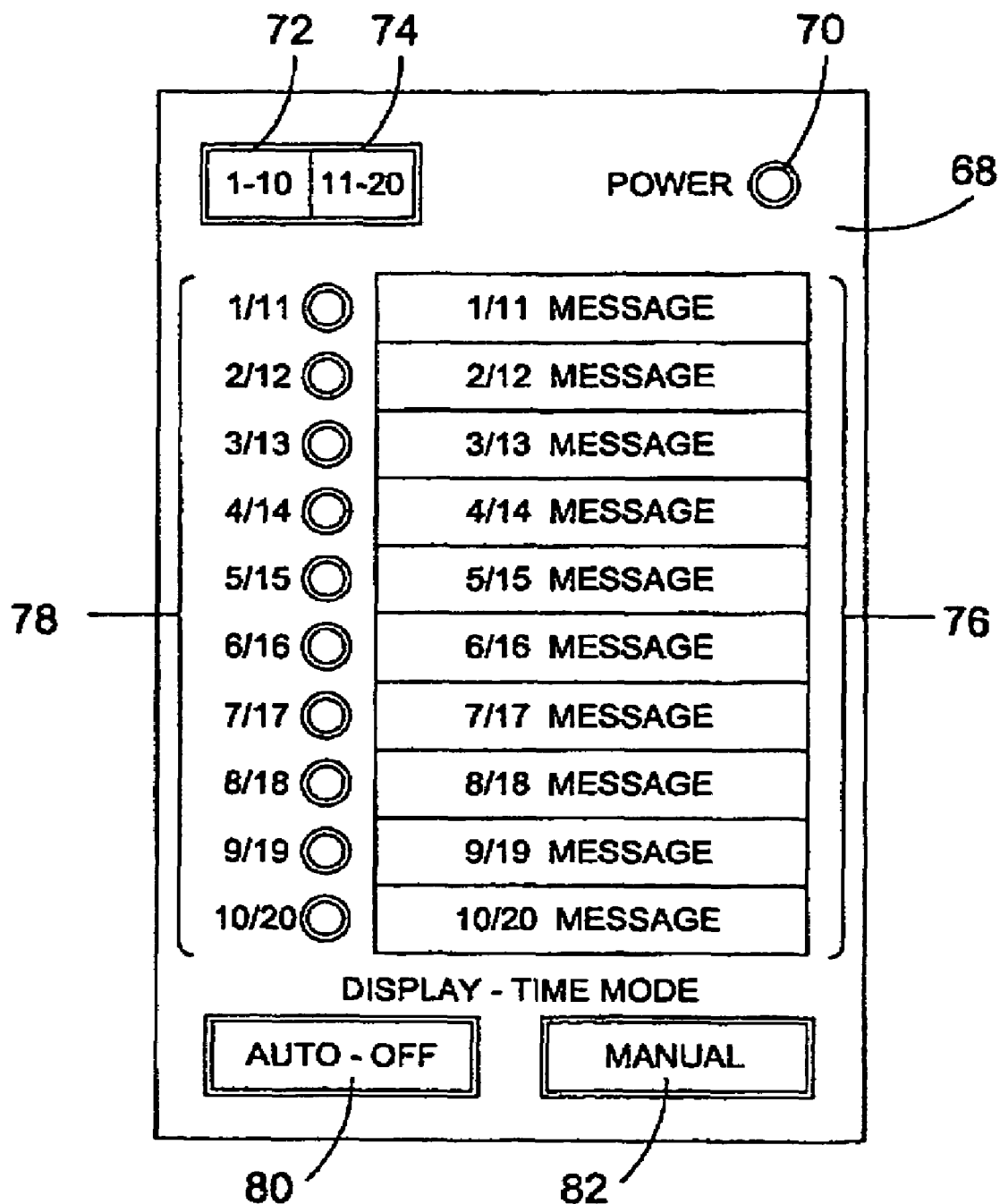
FIG. 6 is a perspective view of the vehicular message display system of the present invention.

FIG. 6 is a perspective view of the remote control 68 for use with vehicular message display system 10 of the present invention. The remote control 68 allows the selection of messages stored therein in a manner discussed above with respect to FIG. 5, for broadcast and display by the MDU 12 positioned within or on the user vehicle 14. A power button 70 is located on the remote control 68 and turns the MDU 12 on or off. The power button 70 may indicate the on/off status of the MDU 12. The remote control 68 further includes a plurality of remote control message selection buttons 78 that correspond to a plurality of remote message displays, located adjacent thereto. Each message is located in one of 20 display locations. However, only 10 messages are displayed in the remote message display 76 at a time. The remote control 68 includes a pair of toggle buttons 72 and 74 that enable the user 26 to switch between messages 1-10 and messages 11-20. Selection of the 1-10 toggle button 72, displays messages 1-10 in the remote message display 76, while selection of the 11-20 toggle button 74, displays messages 11-20 in the remote message display 76. In an alternate embodiment, when the 1-10 toggle button 72 is selected, the numbers 1-10 adjacent to their respective message selection buttons 78, are lit up to indicate the messages that correspond with them are available for selection. To select a message for display, the user 26 will push the message selection button 78 corresponding to the message in the remote message display 76. Pressing the message selection button 78 will latch the button in the "on" position, causing the message and/or button to be distinguished from the other messages/buttons, to alert the user that the selected message is now being actively displayed. Pushing the active message selection button 78 a second time unlatches the button, stopping the message from being displayed. LED's may be employed in the displays.

The remote control 68 further includes an auto-off button 80 and a manual button 82 allowing the user 26 to determine the display-time mode. The auto-off mode is the standard setting. Selection of the auto-off button 80 causes the selected message to display on the MDU 12 for 30 seconds. This time interval is for purposes of example only, and other time intervals may be selected. After 30 seconds, the message will stop being displayed and the user 26 is alerted that the message display time has expired. The alert can include but is not limited to an audio alert or a visual alert. As described above, pressing the message selection button 78 again will unlatch it, causing the alert to stop, and allowing another message to be selected for display. This mode is intended for messages requiring occasional activation, or temporary conditions. It helps prevent the user from accidentally leaving an outdated message activated on the MDU 12.

In an alternate embodiment, a new message cannot be displayed if any of the message selection buttons 78 are latched. To display the same message again, the message selection button 78 needs to be pressed twice, once to unlatch it, and a second time to latch it and re-activate the message display for another 30 seconds.

Selection of the manual button 82 is intended for occasional use. In the manual mode, message will continue to be displayed on the MDU 12 as long as the corresponding message selection button 78 is latched. This mode is useful for displaying messages intended for continual broadcast. To turn off a message in the manual mode, the message selection button 78 is pressed to unlatch it.

Figure 7:
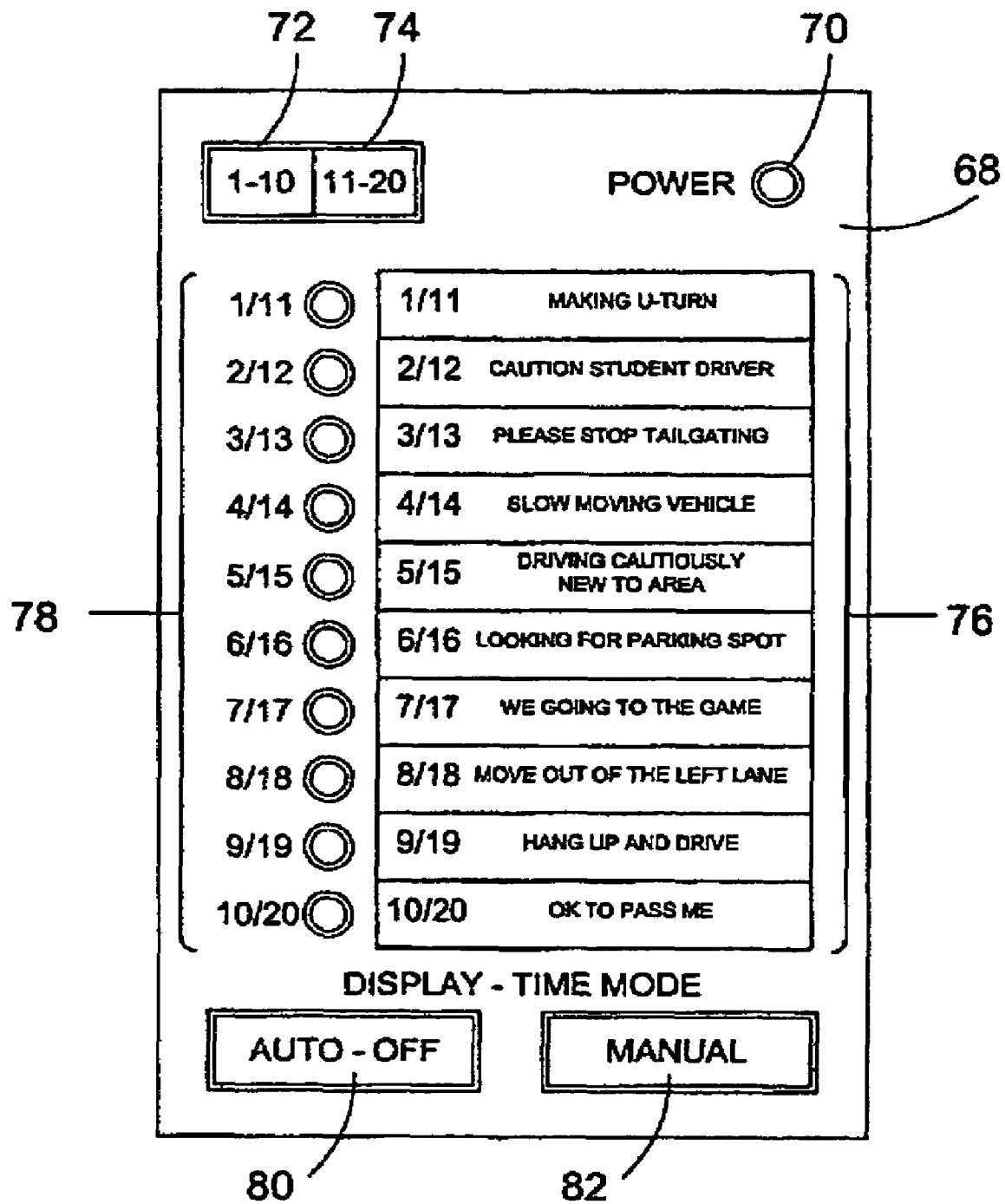
FIG. 7 is a perspective view of the vehicular message display system of the present invention.

FIG. 7 is a perspective view of the remote control 68 of the vehicular message display system 10 of the present invention. As described above with respect to FIG. 6, the remote control 68 includes a power button 70 for turning the MDU 12 on and off. The messages are displayed in the remote message display 76 and the message selection buttons 78 correspond to the messages in the message display 76. Selection of the 1-10 toggle button 72 allows the user 26 to choose one of messages 1-10 for display on the MDU 12. Selection of the 11-20 toggle button 74 allows the user 26 to choose one of messages 11-20 for display on the MDU 12. The MDU 12 may have pre-existing messages, which the user 26 may keep or change. These pre-existing messages include but are not limited to 1. Making U-Turn; 2. Caution Student Driver; 3. Please Stop Tailgating; 4. Slow Moving Vehicle; 5. Driving Cautiously-New to Area; 6. Looking for a Parking Space; 7. Going to the Game; 8. Move Out of the Left Lane; 9. Hang Up and Drive; and 10. OK to Pass Me.

The remote control 68 further includes the auto-off button 80 and the manual button 82 allowing the user to determine the display-time mode. The auto-off button 80 turns off the selected message after a predetermined amount of time. This mode is preferred because it prevents the display of an outdated message. The manual button 82 causes the message selected by latching the corresponding message selection button 78 to be displayed until the message is unselected, via the unlatching of the message selection button 78.

Figure 8:
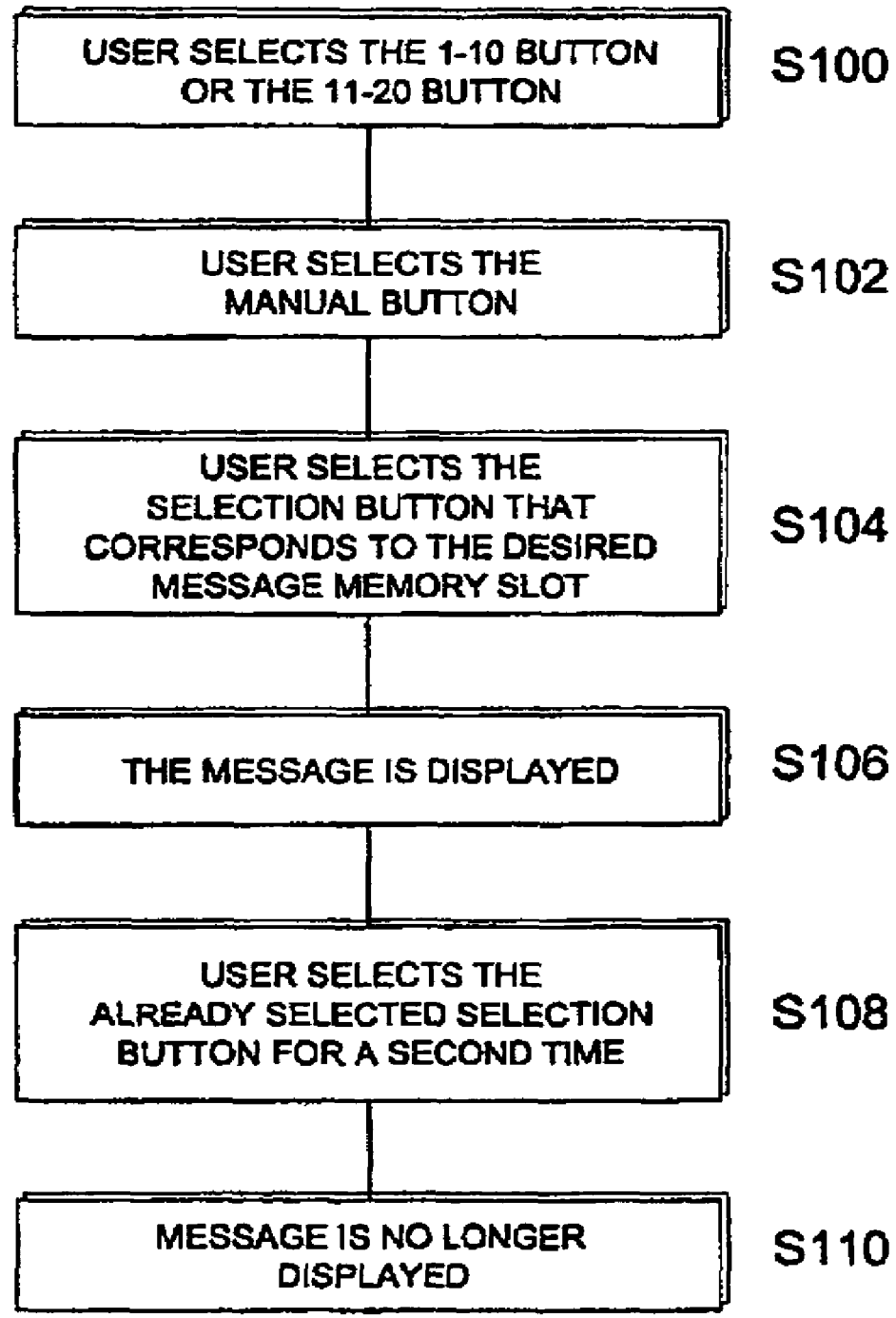
FIG. 8 is a flow diagram of the vehicular message display system of the present invention.

FIG. 8 is a flow diagram of the vehicular message display system 10 of the present invention. In step S100, the user 26 selects the 1-10 toggle button 72 or the 11-20 toggle button 74. Then in step S102, the user 26 selects the manual button 82. In step S104, the user selects the message selection button 78 that corresponds to the desired message displayed in the remote message display 76. In step S106, the selected message is displayed on the MDU 12. The user 26 selects the already selected message selection button a second time in step S108. In step S110, the message is no longer displayed on the MDU 12.

Figure 9:
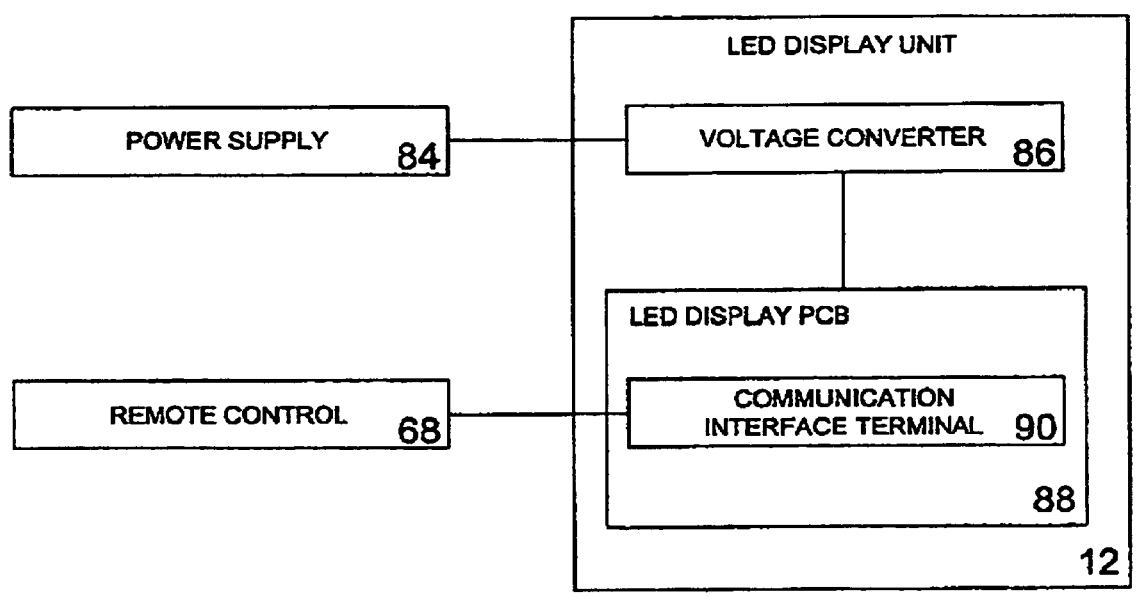
FIG. 9 is a block diagram of the vehicular message display system of the present invention.

FIG. 9 is a block diagram of the vehicular message display system 10 of the present invention. The MDU 12 houses a voltage converter 86 and a LED display PCB 88. A power supply 84, including but not limited to the vehicle's battery provides the power to operate the MDU 12. When the power supply 84 is not the appropriate form for the MDU 12, the power supply 84 is connected to the voltage converter 86. Additionally, when the vehicle battery is the power supply 84, the MDU 12 turns off when the vehicle is turned off to prevent the battery from inadvertently being used. The remote control 68 transmits a signal to a communication interface terminal 90 housed within the LED Display PCB 88. Upon receipt of the signal, the interface parses the signal to determine the data contained therein. The parsed data is the displayed on the display of the MDU thereby providing a visual representation of the data to other drivers in the manner discussed hereinabove.

Figure 10:
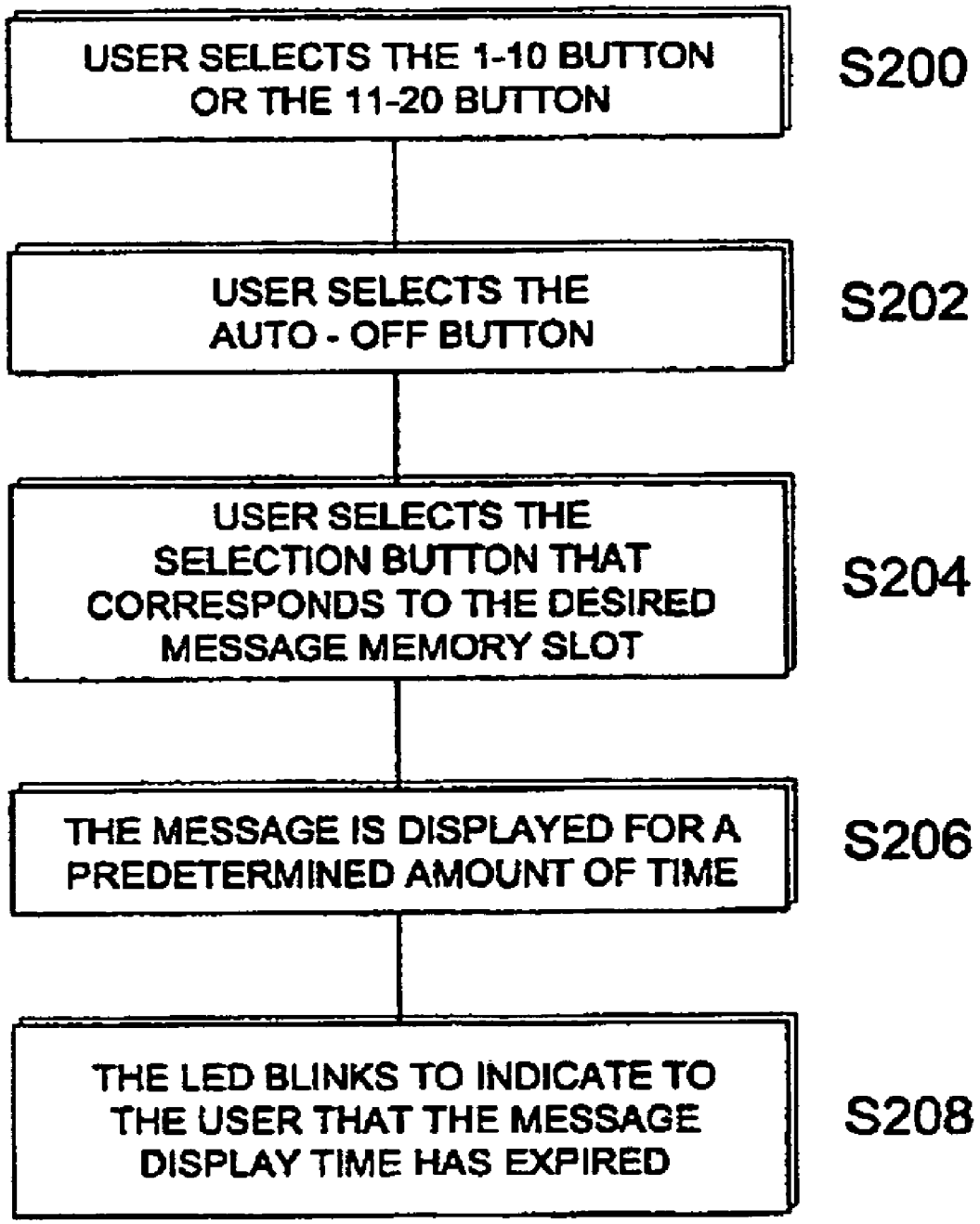
FIG. 10 is a flow diagram of the vehicular message display system of the present invention.

FIG. 10 is a flow diagram of the vehicular message display system 10 of the present invention. In step S200, the user 26 selects the 1-10 toggle button 72. Then in step S202, the user 26 selects the auto-off button 80. The user 26 then selects the message selection button 78 that corresponds to the desired message displayed in the remote message display 76 in step S204. In step S206, the message is displayed on the MDU 12 for a predetermined amount of time. Then in step S208, the message selection button 78 alerts the user 26 that the message display time has expired and the message is no longer displayed. The alert includes but is not limited to a visual alert and an audio alert.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A message display system disposed in a vehicle comprising:
   a display unit mounted in a manner such that a message displayed in said unit is viewable from outside of said vehicle;
   a control mechanism integral with said vehicle for customizing the message displayed on the display unit;
   said control mechanism having a message text box for displaying selected messages either input by said user or selected by scrolling arrows adjacent said message text box;
   a remote control for uploading message selections and customizations made in said control mechanism by said user; and
   said remote control having buttons for making a selection of a message to be displayed on the display unit from the message selections stored therein.

2. The message display system of claim 1 in which said control mechanism includes a group box in said display unit for displaying a group name, and group box scrolling arrows for scrolling through groups of messages in said group box.

3. The message display system of claim 1 in which said control mechanism includes customization buttons for selecting scroll characteristics, blinking characteristics, and text characteristics of the display unit.

4. The message display system of claim 3 in which said remote control has said selected messages arranged in columns with a button for each message for selection by the user for display on the display unit.

5. The message display system of claim 4 in which said remote control has auto-off and manual buttons, use of said auto-off button providing for termination of a displayed message after a predetermined period of time.

6. The message display system of claim 5 in which said remote control emits an audio alert when a message display time has expired.

\* \* \* \* \*